March 31, 1942.   B. E. WILLIAMS   2,278,039
CARCASS BRANDING
Filed Oct. 30, 1940

Beverly E. Williams
INVENTOR

ATTEST-

Patented Mar. 31, 1942

2,278,039

UNITED STATES PATENT OFFICE 2,278,039

CARCASS BRANDING

Beverly E. Williams, Chicago, Ill., assignor to Industrial Patents Corporation, Chicago, Ill., a corporation of Delaware Application October 30, 1940, Serial No. 363,513

5 Claims. (Cl. 216—62)

This invention relates to a method of branding carcass meat and to meat products branded in accordance with the method.

The invention is concerned with branding edible carcasses, or major portions thereof, after the hide or pelt has been removed, and is particularly adapted for use in branding such carcasses as beef, lamb, and veal, using these terms in the trade sense.

One of the objects of the invention is to provide a method for branding edible carcasses, or major portions thereof, by affixing a brand mark in such a manner that the ink will not be in direct contact with the meat surface, but in such a manner that it may not be readily removed.

Another object of the invention is to provide a carcass, or a major portion thereof, which will display a trade-mark or other indicia of quality or origin in such a manner that the mark will appear on the carcass or major portion thereof or ultimate consumer cuts.

Other objects of the invention will be apparent from the description and claims which follow.

In the drawing similar reference characters in the several figures indicate similar elements.

Figures 1, 2:
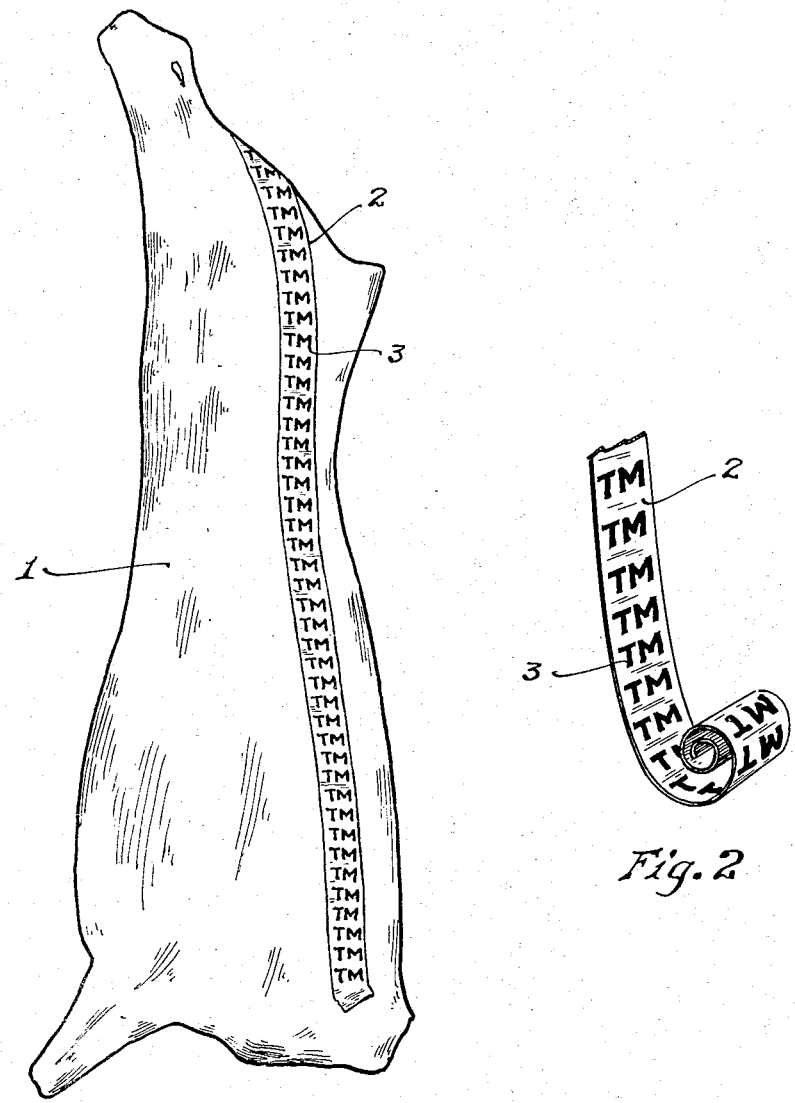
Figure 1 is a view of a side of dressed beef from which the hide has been removed to which is affixed a strip or band 2 bearing a plurality of indicia 3.
Figure 2 is a perspective view of band 2 partially applied to the surface of carcass 1.

In my prior Patent No. 2,083,765, I describe and claim the employment of transparent cellulosic material for branding freshly skinned animal carcasses. The invention described and claimed in Patent No. 2,083,765 has many definite advantages. However, since the transparent cellulose there employed is removably affixed, the brand may be removed at will.

The present invention contemplates a brand which may not be readily removed but in which the ink will not be in direct contact with the meat surface.

In carrying out the present invention, the strip or band 2 which bears the printed indicia is prepared from a thin tissue. Satisfactory tissues are prepared from virgin spruce sulphite pulps. I have found in practice that a seven pound long fiber tissue or a ten pound short fiber tissue both give excellent results. The tissue strip is applied to the moist surface of the carcass meat. The moisture quickly impregnates the fibers and renders the tissue less opaque, whether a white tissue is employed or a cream-colored tissue such as condenser paper, which I have also found satisfactory in practice. The moisture on the surface of the carcass carries gelatinous material in solution with which the fibers are thoroughly impregnated and which upon wetting form a firm bond between the tissue and the meat. The fibrous nature of these tissues is such that the moisture disintegrates the body of the paper, and the thin sheet of tissue ceases to exist as a sheet of paper having tensile strength and becomes in effect a mere mat of fibers on the surface of the meat, bearing on the outer surface of the meat the desired printed indicia, rendering it extremely difficult to remove the brand, although removal can be accomplished by scraping or cutting.

It has been found that by using a tight fitting cloth, for example, a muslin, over the tissue paper brand which has been applied to the warm skinned surface of the carcass, more perfect adherence of the tissue to the meat, and a protective covering for the thin tissue strip is obtained. If the tissue is used without subsequent application of the cloth, a perfect adhering brand may not be obtained, because the tissue may be only partially moistened, since the moisture in the carcass may not be sufficiently evenly distributed to wet completely the tissue. If, however, a cloth is applied tightly over the tissue branded carcass, the moisture of the cloth will evenly moisten the strip at all points. This is important with a tissue strip which disintegrates in order to produce a uniform legible brand.

Furthermore, the cloth applied over the warm tissue branded carcass will absorb moisture, serum, blood, blood spots, etc., and will do this even absorbing through the tissue brand. As a result, disfiguring of the brand by blood spots or otherwise is substantially avoided.

The cloth that may be applied over the tissue brand may be a beef sheeting, muslin, etc. The cloth may be moistened before application if the carcass is not sufficiently moist to effect uniform wetting of the cloth and the brand. The moistened cloth will cause complete moistening of the brand, whereby it adheres evenly to the carcass, even though the carcass may be deficient in the amount of moisture naturally on the surface thereof. Moreover, the cloth may be moistened with a sodium chloride salt solution, and the resulting brine soaked cloth applied over the tissue brand. The brine soaked cloth in addition to the property of causing the tissue brand to firmly adhere to the carcass, also causes the carcass to remain in a fine state of preservation.

It will be understood, of course, that the tissue may be applied in the form of a strip or in any other desired shape.

It will be seen that the present invention provides a branded meat product comprising a carcass or major portion thereof having a brand attractively repeated. The tissue offers no resistance to the division of the carcass into consumer cuts, and consequently steaks and roasts cut from a carcass so branded will bear on the outer edge the desired brand mark which the butcher need not remove. If the ultimate consumer desires to remove the brand it may be done.

The best results are secured in carrying out the present invention upon a freshly skinned carcass which is moist, whereby the gelatinous serums naturally present no the surface of a carcass are in solution in the moisture.

The paper upon which the brand is printed is preferably a thin tissue. It is necessary for the best results that the paper be not treated in any manner to prevent hydration upon the application of water. If the surface of the carcass to which the brand is to be applied is not moist, it should be moistened with water. The moisture hydrates the tissue. The hydrated tissue is, of course, semi-transparent. The gelatinous serum conveyed into the interstices of the fibers by the moisture in effect sizes the paper, whereby after dehydration in whole or in part, the tissue remains semi-transparent.

In the claims the term "tissue" will be understood to be limited to cellulose papers which may be hydrated in the sense in which the term is used in this specification. The term "carcass" as used in the claims includes, in addition to the skinned whole carcass, major portions thereof such as the sides.

This application is a continuation in part of my earlier application Serial No. 155,049, filed July 22, 1937.

Obviously many modifications and variations of the invention as hereinbefore set forth may be made without diverting from the spirit and scope thereof, and therefore only such limitations should be imposed as are indicated in the appended claims.

I claim:

1. The method of treating edible carcasses which comprises applying to the moist, freshly skinned surface a tissue paper bearing identifying marks, said tissue paper tending to become disfigured by absorption of blood and moisture from the carcass, and covering said tissue with a cloth to absorb said blood and moisture through the tissue paper whereby improved identifying marks are obtained.

2. The method of treating edible carcasses which comprises applying to the moist, freshly skinned surface a fibrous cellulose tissue bearing identifying marks, said tissue tending to disintegrate and to leave the identifying marks on the carcass, and covering said tissue with a tightly fitting cloth to absorb blood and moisture and to cause smooth adherence of the tissue to the carcass, whereby improved identifying marks are obtained.

3. The method of treating edible carcasses which comprises applying to the moist, freshly skinned surface a tissue paper bearing identifying marks, said tissue tending to disintegrate and leave difficultly removable identifying marks on the carcass, and covering said tissue applied carcass with a cloth whereby the cloth absorbs the moisture from the carcass to produce a moist cloth which causes smooth adherence of the tissue to the carcass and uniform disintegration thereby.

4. The method of treating edible carcasses, which comprises applying to the skinned surface, before the carcass has lost its animal heat, a tissue paper bearing identifying marks and a cloth, said tissue tending to disintegrate by the moisture from the carcass and said cloth tending to absorb the moisture and blood, whereby the tissue is less soiled and is disintegrated more evenly than without said cloth, and removing said cloth after the animal heat has been dissipated to produce a carcass bearing difficultly removable identifying marks.

5. The method of treating edible carcasses which comprises applying to the moist freshly skinned carcass a thin semi-transparent tissue paper bearing identifying marks, said tissue tending to become disfigured by absorption of blood and moisture from the carcass, and covering said tissue with a brine moistened cloth to cause the tissue to firmly adhere to the carcass and to preserve the carcass and the appearance of the tissue.

BEVERLY E. WILLIAMS.